United States Patent [19]

Todd, Sr.

[11] Patent Number: 4,930,253
[45] Date of Patent: Jun. 5, 1990

[54] PLANT GROWING AND HANDLING METHOD

[75] Inventor: George K. Todd, Sr., Ruskin, Fla.

[73] Assignee: Speedling Incorporated, Sun City, Fla.

[21] Appl. No.: 256,390

[22] Filed: Oct. 5, 1988

Related U.S. Application Data

[62] Division of Ser. No. 831,914, Feb. 20, 1986, Pat. No. 4,793,096.

[51] Int. Cl.⁵ .............................................. A01G 31/02
[52] U.S. Cl. ................................. 47/65; 47/62; 47/63; 47/17
[58] Field of Search ................... 47/59, 60, 61, 62, 63, 47/64, 65, 87, 17

[56] References Cited

U.S. PATENT DOCUMENTS

| | | | |
|---|---|---|---|
| 3,579,907 | 5/1971 | Graves | 47/17 |
| 3,667,159 | 6/1972 | Todd | 47/87 |
| 4,312,152 | 1/1982 | Drury et al. | 47/62 X |
| 4,505,068 | 3/1985 | Kaneko | 47/59 |
| 4,513,533 | 4/1985 | Gething et al. | 47/63 |

*Primary Examiner*—Robert A. Hafer
*Assistant Examiner*—Kevin G. Rooney
*Attorney, Agent, or Firm*—Mason, Fenwick & Lawrence

[57] ABSTRACT

A plant flat handling system for handling floatable plant flats employs a horizontally extending main channel which can be flooded from either a water tank or a nutrient containing tank with a plurality of branch channels extending outwardly from the main channel. Gate valve means between the branch channel and the main channel can be opened to permit the main channel to fill the branch channel or to drain the branch channel when the main channel is drained. Plural wires extend along the length of the branch channels and support floating plant flats when the branch channels are drained. Periodic flooding and draining of the branch channels is effected until plants in the flats have matured and can be harvested. Harvesting is effected by maintaining light pressure against the outermost plant flats in the branch channel to urge the body of plant flats toward a main work area overlying the main channel. A power conveyor extends downwardly into the branch channel and lifts the flats therefrom for harvesting. A reverse procedure is employed when plant flats are to be deposited in a flooded branch channel with the power conveyor lowering the flats into the channel so that newly added flats push previously positioned flats outwardly along the length of the channel until the channel has been covered with flats.

9 Claims, 8 Drawing Sheets

PLANT GROWING AND HANDLING METHOD

This application is a division of application Ser. No. 831,914, filed Feb. 20, 1986, now U.S. Pat. No. 4,793,096 issued 12/27/88.

BACKGROUND OF THE INVENTION

The present invention is in the field of plant growing systems and is specifically directed to the field of seedling growing, particularly greenhouse growing such as the growing of tomato seedlings and the like.

Figure 1:
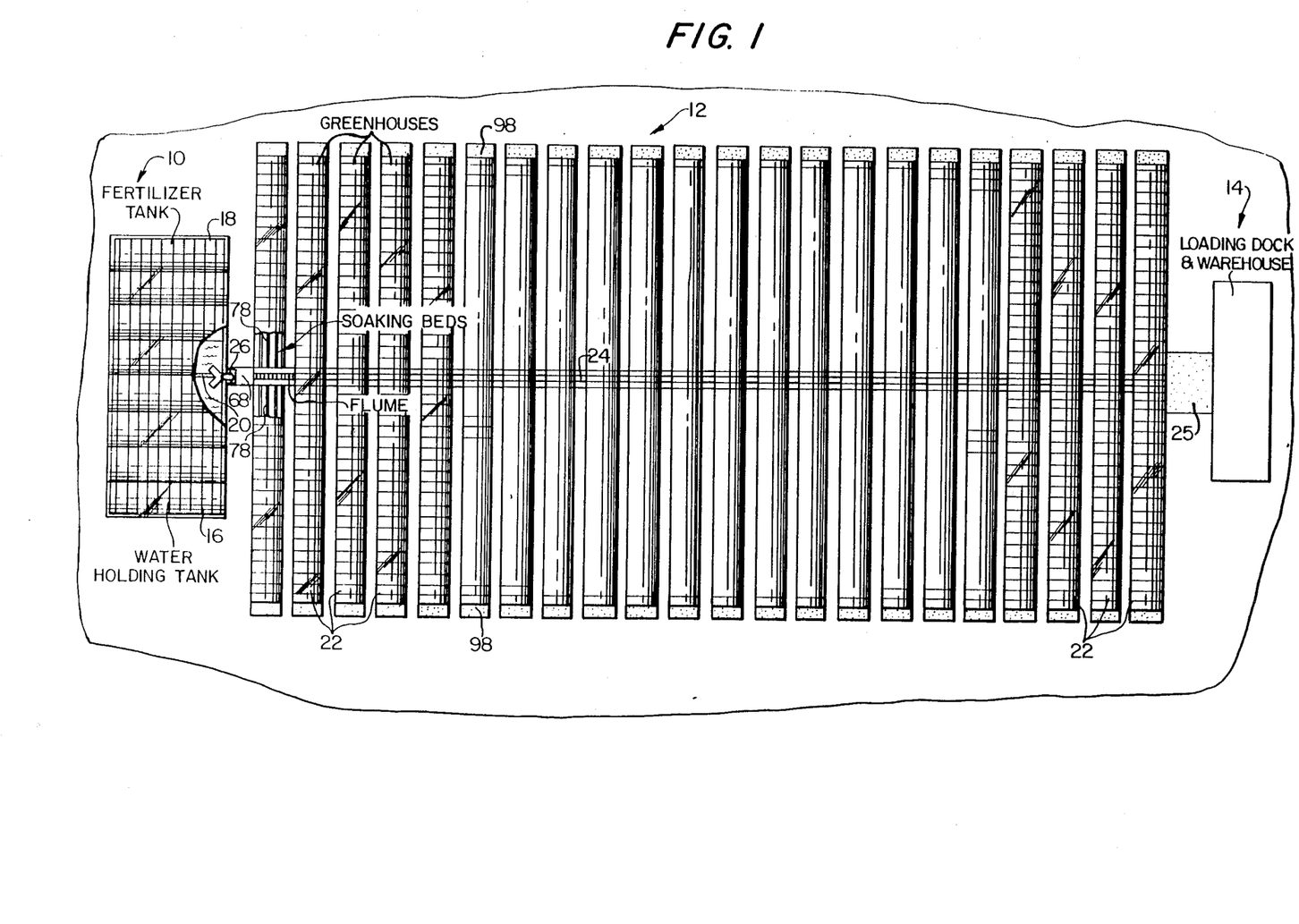
FIG. 1 is a plan view of the preferred embodiment for practice of the invention.
Figures 2, 3, 4, 5:
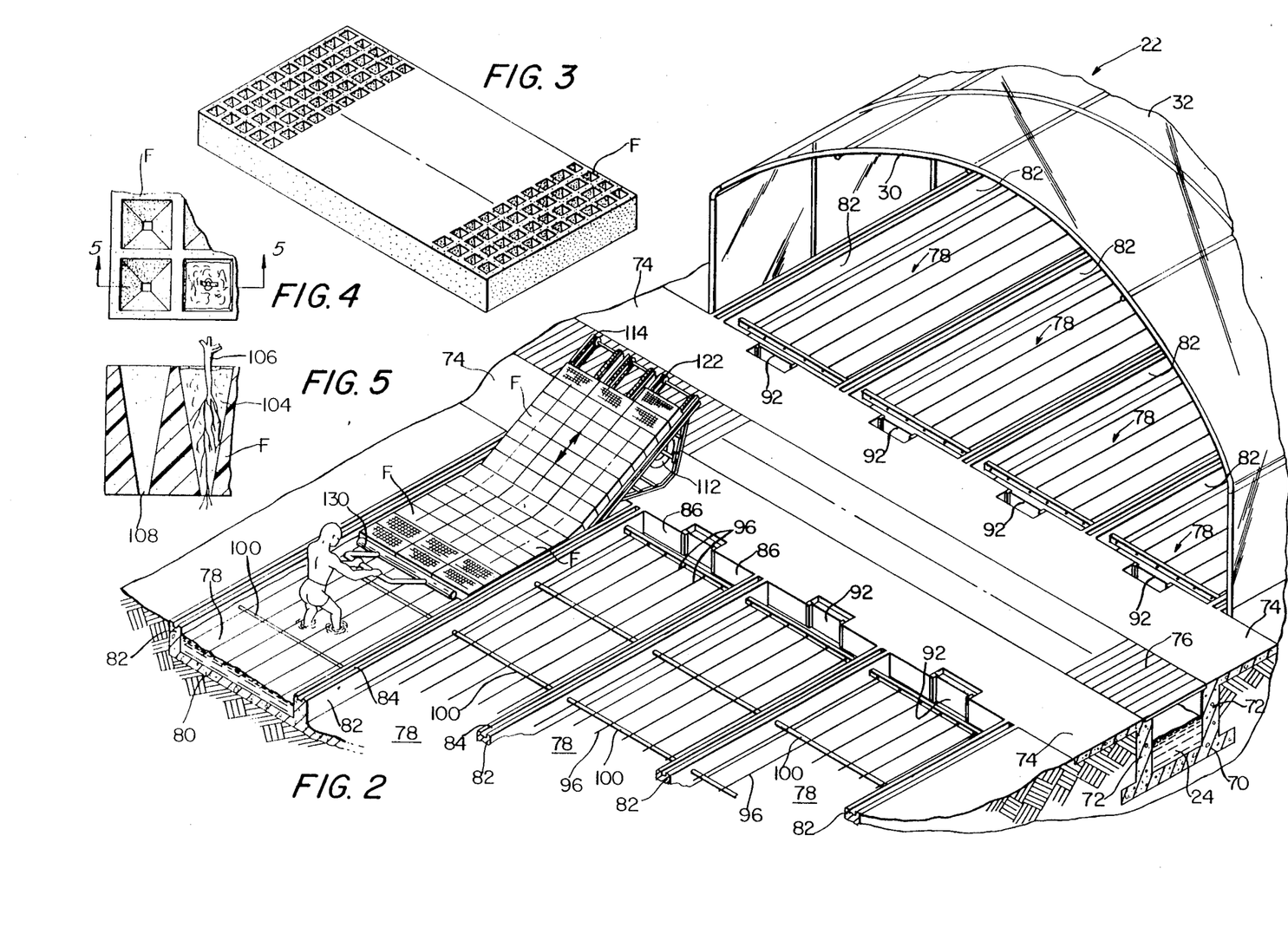
FIG. 2 is a perspective view of a portion of the preferred embodiment as viewed from above.
FIG. 3 is a perspective view of a plant flat of the type employed in the preferred embodiment.
FIG. 4 is an enlarged top view of a portion of the plant flat of FIG. 3.
FIG. 5 is a sectional view taken along lines 5—5 of FIG. 4.

Earlier U.S. Pat. No. 3,667,159 discloses a seedling flat formed of foamed plastic as shown in FIGS. 1 and 2 of said patent in which planting cells 32 are provided with lower openings 34 and are tapered downwardly so that the seedlings can be easily removed. Seedlings have been grown in such flats with watering being effected by overhead spray means, a procedure that is wasteful of water and inducive of disease in the plants. The present invention is directed to a unique system for handling flats of the aforementioned type and for providing nutrients to seedlings in such flats by the floatation of the flats on nutrient containing liquid so that the nutrient containing liquid flows upwardly into the planting cells through the lower openings 34.

It has been previously proposed to provide seedling plants in a support from which the plant roots downwardly extend into a floodable trough or the like which is periodically flooded to provide water and/or nutrients to the roots. Examples of such devices are found in U.S. Pat. Nos. 3,451,162; 3,925,926; 4,324,069 and 4,327,538. U.S. Pat. No. 4,486,977 also discloses similar concepts.

It has additionally been proposed to provide floating plant flats or the like which float on a body of liquid providing nutrients for plants in the flat as shown in U.S. Pat. Nos. 2,175,113; 2,531,562; 3,927,491; 4,028,847; 4,034,506; 4,037,360; 4,312,152; 4,468,885; and 4,513,533. Additionally, British patent Nos. 1,031,309; 1,038,320; 1,053,508; and 1,313,121 also disclose similar floating plant flat systems.

It has also been proposed to provide a trough including wire means for supporting a plant container such as in U.S. Pat. No. 4,075,785. Similarly, Austrian patent No. 241,896 appears to disclose the use of wire supports for plant flats. Other prior art devices of interest include U.S. Pat. Nos. 4,004,369 and 4,166,341.

SUMMARY OF THE INVENTION

It is the primary object of the present invention to provide a unique and improved plant handling system and method.

Achievement of the foregoing object is enabled by the preferred embodiment of the invention which comprises a storage tank or reservoir in which liquid containing nutrients is maintained. Valve means in the lower portion of the storage tank or reservoir communicates with a sump which in turn communicates with a generally horizontally extending main channel in the nature of a flume formed of concrete and having a open-topped or closed rectangular fluid conduit extending along its length. A plurality of parallel branch channels extend outwardly from opposite sides of the main channel and communicate therewith through selectively operable gate valve members so that liquid in the main channel can flow into the branch channel if the gate valve means is opened. Each branch channel is provided, with a plurality of parallel wires extending along its length and supported intermittently by transverse beams extending across the width of each branch channel. A plurality of floatable plant flats of the type disclosed in U.S. Pat. No. 3,667,159 are provided in each branch channel and are arranged in lengthwise extending and transversely extending rows with respect to each branch channel.

Pump means are provided for pumping liquid from the sump back into the storage tank or reservoir to consequently drain the main channel and any branch channels in which the gate valve means has been opened. When the branch channels are drained in the aforementioned manner, the plant flats therein are supported by the parallel support wires extending the length of each respective branch channel.

The space over the main channel is provided with a wooden decking extending along its length. Additionally, first and second concrete slabs run along the length of each side of the main channel and cooperate with the wooden decking to define a work area extending adjacent the inner ends of each of the branch channels. The center area of the greenhouse, over the main channel, is of reinforced concrete with manholes periodically to clean and service the main water channel.

Plant flats are loaded into and taken from the branch channels by the use of a unique portable elevator arrangement positionable in the work area to extend downwardly into a selected branch channel for receiving plant flats from, or dispatching plant flats to the respective branch channel. Pusher means engageable with the outermost transverse row of floating plant flats acts to move the innermost transverse row of flats onto the elevator conveyor means with such movement being easily effected with the branch channel being in a flooded condition so that the flats float on the liquid therein.

A better understanding of the preferred embodiment of the invention will be achieved when the following detailed description is considered in conjunction with the appended drawings in which like reference numerals are used for the same parts as illustrated in the different FIGS..

DESCRIPTION OF THE PREFERRED EMBODIMENT

Attention is initially invited to FIG. 1 of the drawings which illustrates the entire system and which consists of three main areas comprising a liquid storage and dispensing area 10, a greenhouse area 12 and a loading dock and plant handling area 14. The liquid storage area 10 includes a water holding tank 16 in which water is stored and a nutrient holding tank 18 in which water containing nutrients is stored. A metal frame supported plastic cover 19 extends over tanks 16 and 18.

Figure 7:
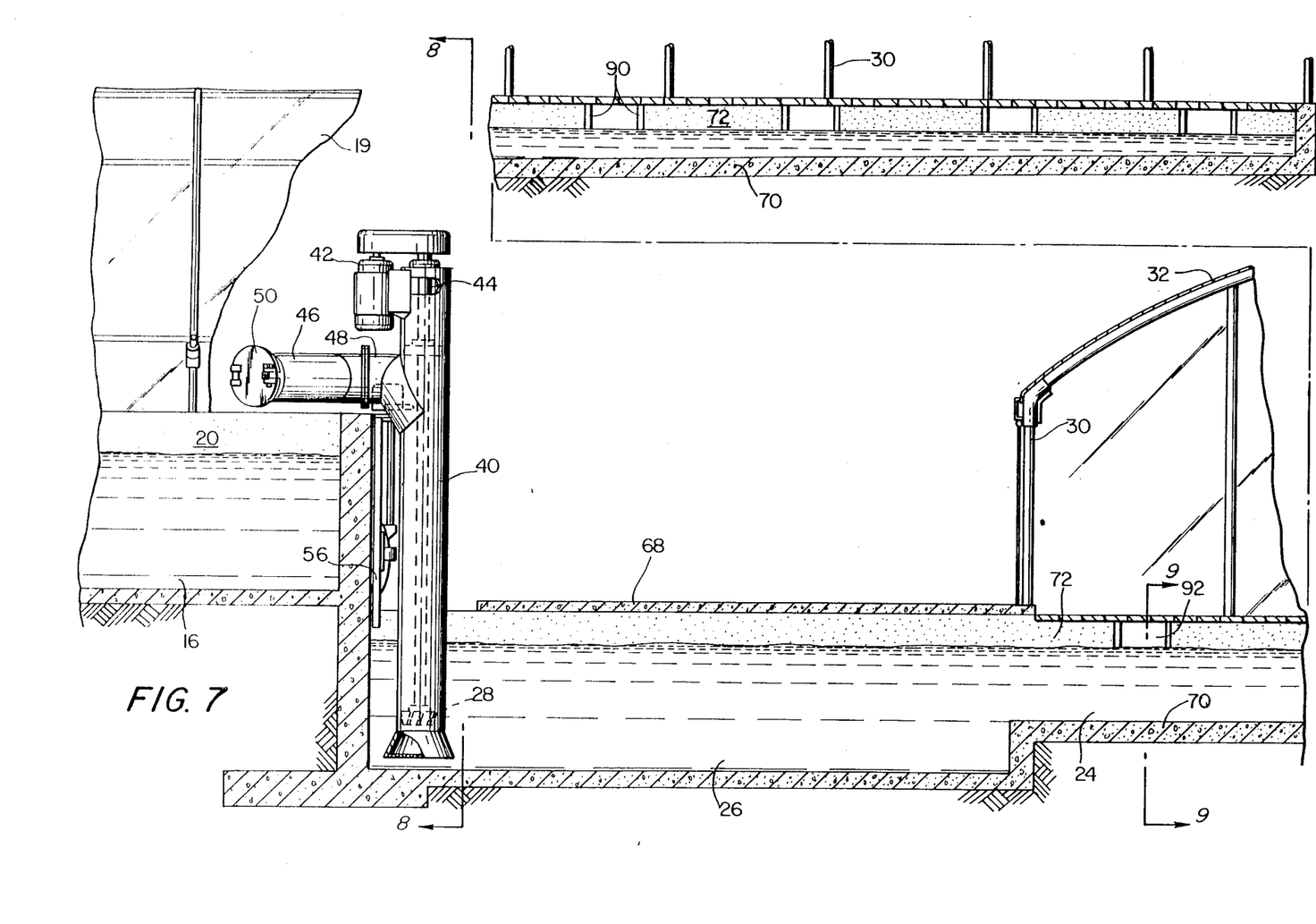
FIG. 7 is a sectional view taken along lines 7—7 of FIG. 6.
Figure 8:
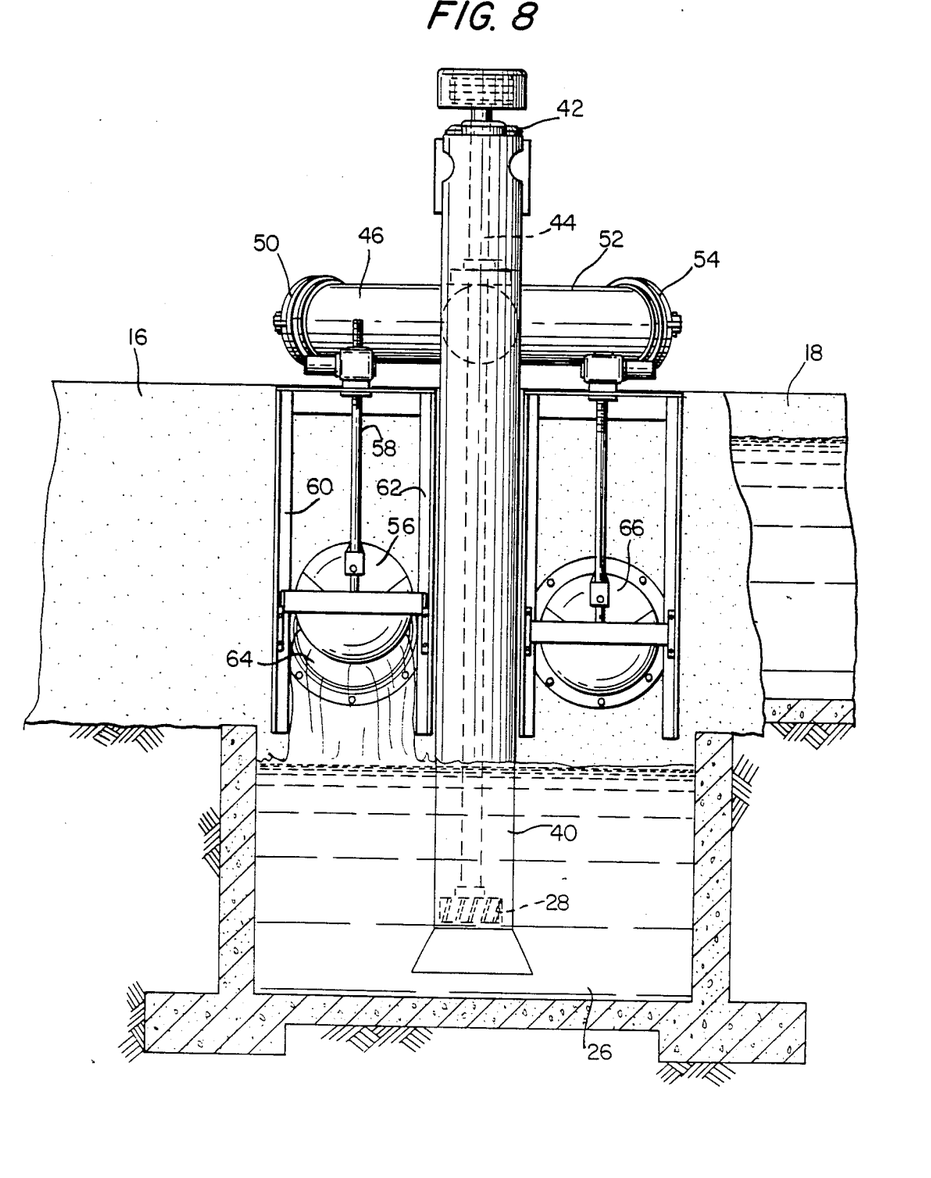
FIG. 8 is a sectional view taken along lines 8—8 of FIG. 7.

Water tank 16 is separated from nutrient tank 18 by a wall 20. A plurality of greenhouses 22 extend parallel to each other transversely over a main channel 24 which extends to a slab 25 in the plant handling area 14 on one end and which communicates on its opposite end with a sump 26 as shown in FIG. 7.

Greenhouses 22 are of conventional construction employing metal frame means 30 and plastic top and side covering material 32 which can be rolled-up and opened to permit air circulation as required.

Figure 6:
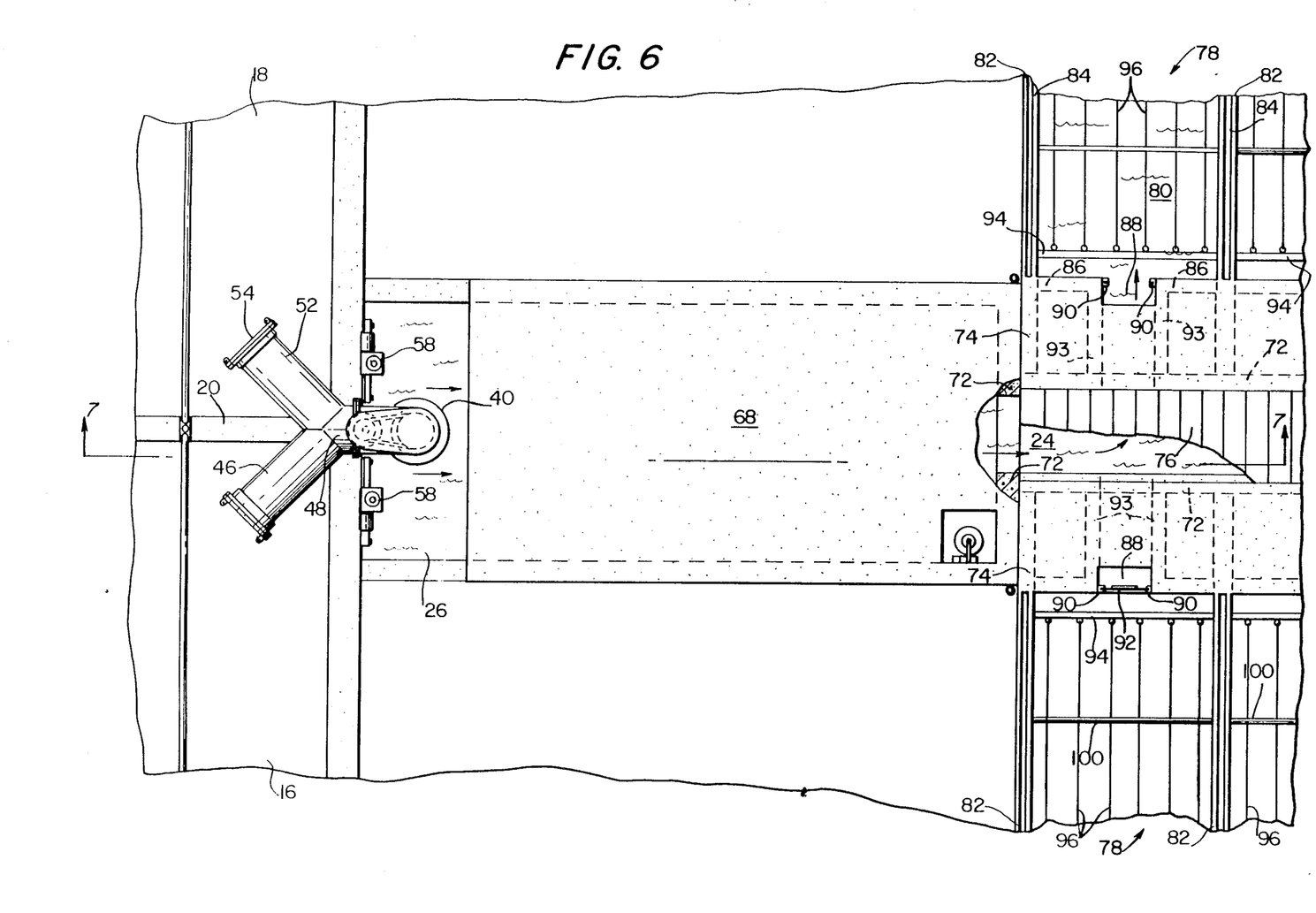
FIG. 6 is a plan view of liquid supply and control means employed in the preferred embodiment.

A vertical standpipe 40 has its lower end in sump 26 and encloses a pump 28 with the upper end of the standpipe supporting electric motor 42 for driving pump 28 by means of shaft 44 in an obvious manner. A water discharge conduit 46 has its inner end connected to the upper end of standpipe 40 by a short discharge conduit 48 extending outwardly therefrom as best shown in FIG. 6. The inner end of the water discharge conduit 46 is provided with a rugged blocking cap 50 attached thereto for hinged movement between open and closed positions. Similarly, a liquid nutrient discharge conduit 52 has its inner end connected to the main discharge conduit 48 and has a blocking cap 54 identical to cap 50 attached to its outer end.

Discharge of water from the water tank 16 into sump 26 is enabled by a vertically movable valve gate 56 which is raised or lowered by threaded rod 58 gate valve 56 is restricted to vertical movement by side guides 60 and 62. In its lowermost position, gate valve 56 completely blocks a discharge opening 64 provided in the wall of water tank 16. Similarly, a gate valve 66 is provided in a wall of the nutrient tank 18 for permitting the discharge of liquid nutrient therefrom. The construction and operation of gate valve 66 is identical to that of gate valve 56. A concrete slab cover 68 extends over the sump 26 as best shown in FIGS. 6 and 7.

Figure 9:
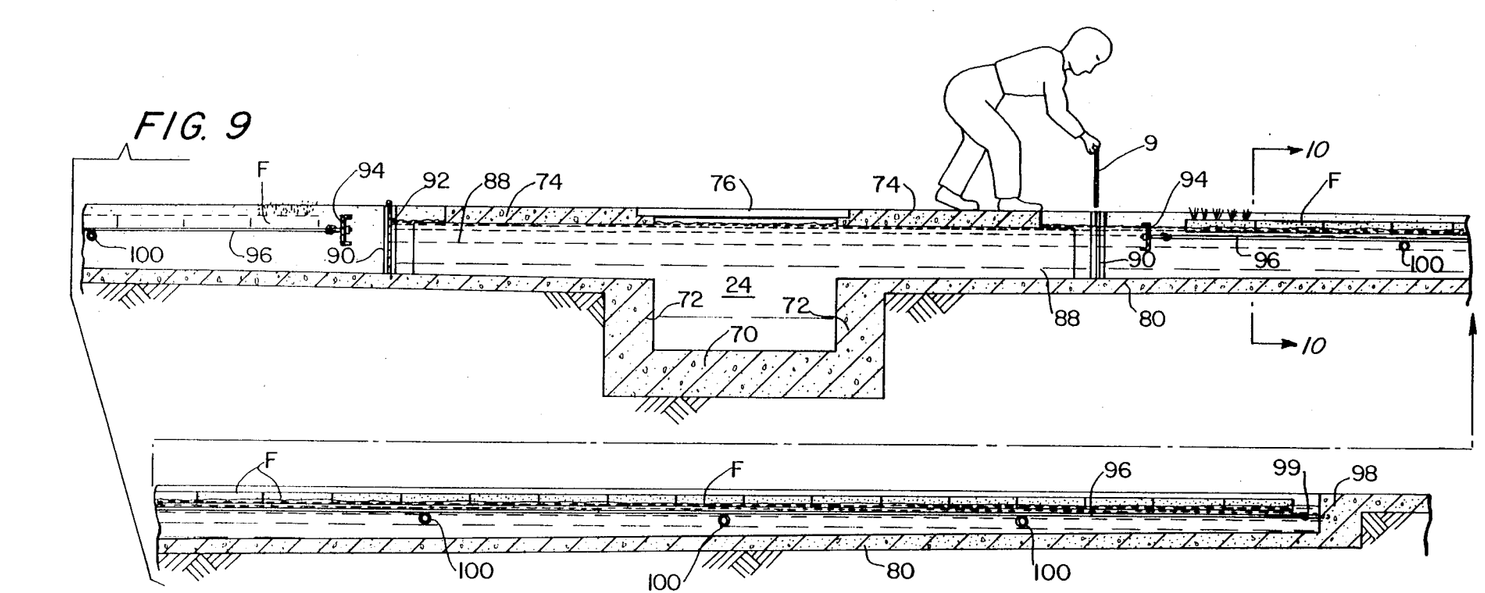
FIG. 9 is a sectional view taken along lines 9—9 of FIG. 7.
Figure 10:
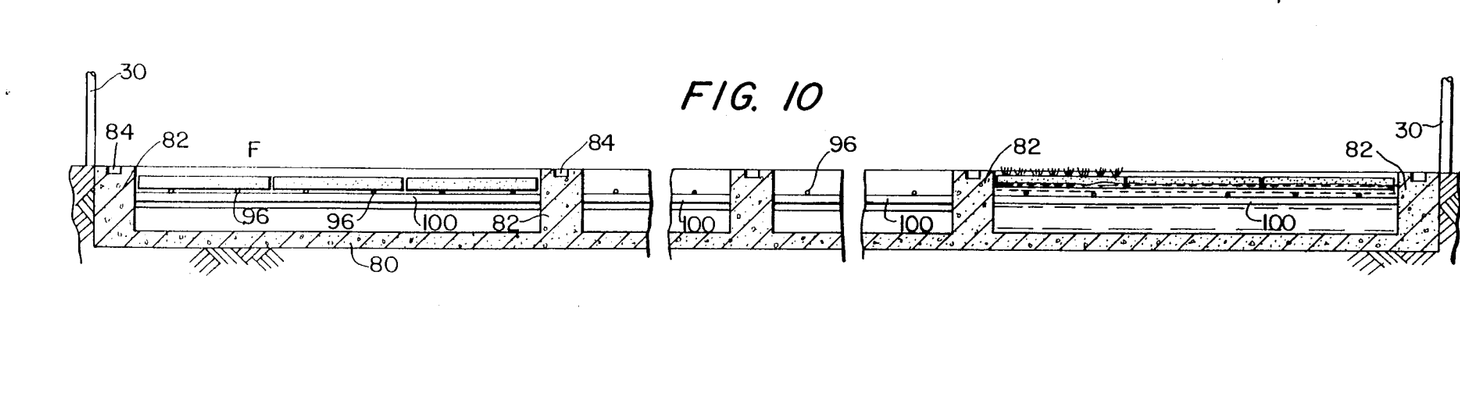
FIG. 10 is a sectional view taken along lines 10—10 of FIG. 9.

Main channel 24 is formed of a floor slab 70 and a pair of vertical side walk 72 as best illustrated in FIG. 2. Additionally, side wall slabs 74 extend outwardly in horizontal manner from the upper edges of the side walls 72. Thus, it will be seen that the members 70 and 72 cooperate to define an open-topped channel which is covered by boards 76 having their ends supported on lengthwise extending edge recesses in the upper edges of side walls 72 as shown in FIGS. 2 and 9. The upper surfaces of boards or reinforced concrete cover 76 and sidewalks 74 are coplanar and cooperate to define a relatively wide work area in which equipment and personnel can operate.

Each greenhouse 22 covers one to four branch channels 78 each extending outwardly perpendicularly and transversely to the main channel 24. The branch channels 78 are formed by a floor slab 80 and two to five parallel vertical walls 82. It should be observed that the vertical walls 82 are each provided with an upper groove 84 of sufficient depth to receive wheels of a spray or work carriage or the like (not shown) which can be moved along the length of each of the branch channels if desired. The inner extent of each branch channel 78 is defined by first and second inner vertical end walls 86 coextensive with the outer edges of sidewalks 74 and extending upwardly from floor slab 80 and separated by the outer end of a connector conduit 88 as shown in FIG. 6. Vertically extending valve plate guides 90 comprising extruded metal members having vertical slots are positioned on the inner ends of the vertical end walls 86. Each connector conduit 88 is additionally defined by vertical walls 93 and a bottom slab 95 extending between the inner vertical end walls 86 and the side walls 72 of the main channel 24. A valve gate in the form of a metal plate 92 can be positioned in the valve plate guides 90 to prevent fluid flow between the branch channels 78 and main channel 24 in an obvious manner. An alternative method of controlling fluid flow between the branch channels 78 and the main channel 24 is an electrically operated laterally moving, gate.

Each branch channel 78 additionally includes an inner transversely extending wire anchor channel 94 (FIG. 12) to which six taut plant flat support wires 96 are connected with the outer ends of wires 96 being connected to an outer end wall 98 of the branch channels by means of an eyebolt 99 or the like embedded therein as best shown in FIG. 9. Additionally, equidistantly spaced transversely extending wire support pipes 100 are mounted in the walls 82 and extend beneath the wires 96 to support the wires in substantially horizontal parallel alignment with each other.

It should be observed that the slab 80 defining the bottom of the branch channel 78 slopes downwardly slightly from the outer end adjacent end wall 98 toward its juncture with the side walls 72 of the main channel 24 as shown in FIG. 9.

Plant flats F are formed of expandable polystyrene foam or the like and are essentially identical to the foam flats shown in U.S. Pat. No. 3,667,159. The flats are quite buoyant and easily float even when filled with planting media 104 and seedling plants 106. It should be observed that the bottom of each planting cell is open as shown at 108.

Figure 12:
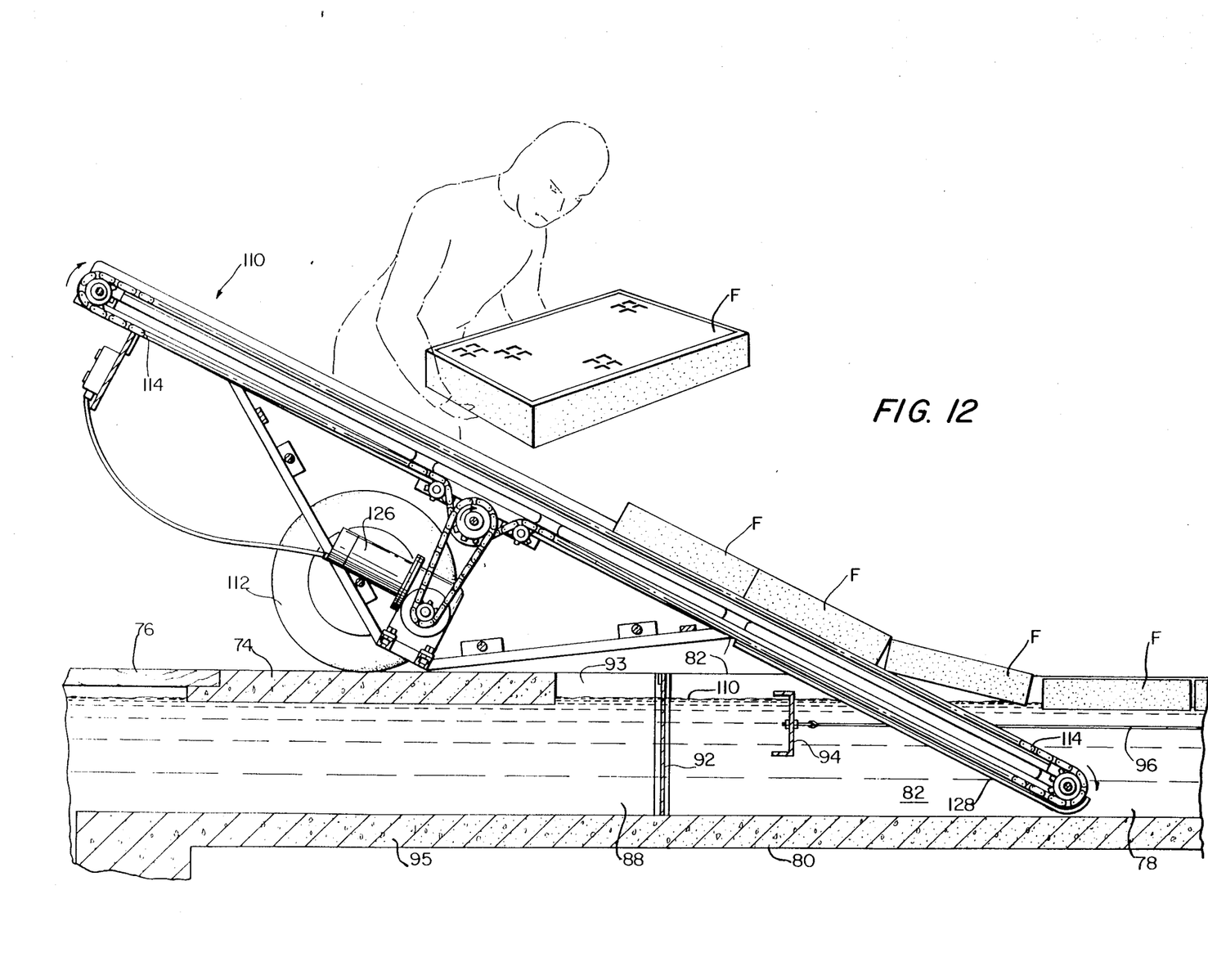
FIG. 12 is a sectional view taken along lines 12—12 of FIG. 11.

When a branch channel 78 is flooded with water or water including liquid nutrients so as to have an upper surface 110 as shown in FIG. 12, the flats F float above the support wires 96 as shown. However, when a branch channel 78 is drained of liquid, the plant flats F rest on wires 96 as shown in the upper left portion of FIG. 9.

Use of the system is effected by initially opening one or the other of valve gates 56 or 66 to flood the main channel 24 and any of the adjacent branch channels 78 from which the valve gate 92 has been removed as shown in the upper right portion of FIG. 9. Those branch channels 78 from which the valve gate has not been removed will remain dry as shown in the upper left portion of FIG. 9. Consequently, any flats resting on the wires 96 in a flooded branch channel will float on the liquid and liquid can flow upwardly into the plant cells of each flat F through the lower opening 108 in an obvious manner. The flats will be permitted to remain floating in this manner for a sufficient time period to permit the planting media 104 to become sufficiently moist; this procedure prevents over-watering due to the limited amount of flow that can occur as a consequence of capillary action. Main channel 24 will then be drained by operation of pump 28 which will return the liquid to the proper tank 16 or 18 depending upon the nature of the liquid; one or the other of blocking caps 50, 54 will be in its closed blocking position during the operation of pump 28. It should be noted that the floor slab 70 slopes downwardly by a slight amount from its outer end adjacent the loading dock slab 25 to its juncture with sump 26. Consequently, the main channel 24 can be easily drained along with its adjacent branch channels. The flats will be permitted to remain suspended on the wires 96 for a predetermined time period depending upon the nature of the particular plants in the flats. The cycle will be repeated at desired intervals until the plants are ready for harvesting.

Figure 11:
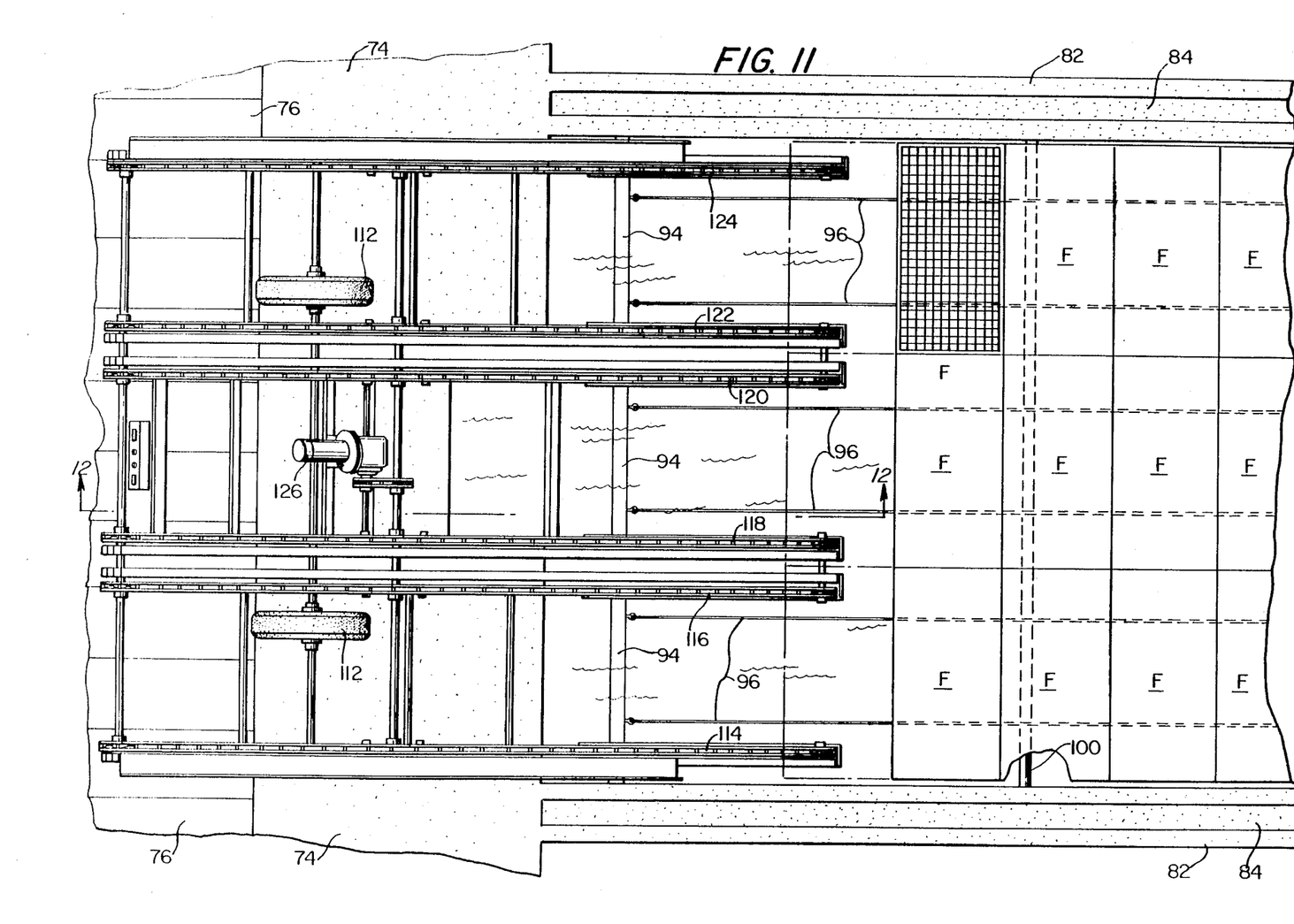
FIG. 11 is a top plan view of elevator conveyor means employed in the preferred embodiment.

Positioning of the flats F in the branch channels 78 is initially accomplished by first flooding the desired branch channels and using a portable elevator conveyor 110 which is best illustrated in FIG. 12. The portable elevator conveyor 110 includes wheels 112 which support a metal framework on which conveyor chains 114, 116, 118, 120, 122 and 124 are mounted. Chains 114 etc are driven by reversible electric motor means 126 as shown in FIG. 12. The forward ends of the chains 114 etc are provided with guard members 128 on their lower and forward ends and are positionable in the branch channels 78 as shown in FIGS. 11 and 12. When the chains 114 etc. are driven in the direction illustrated in FIG. 12 the portable elevator conveyor 110 serves to deposit flats F in the branch channel 78 in an obvious manner. The flats are deposited serially and each flat pushes previously deposited flats outwardly away from the work area. A floating pusher 130 maintains the first row of flats in alignment. Operation of the conveyor chains 114 in an opposite direction can be employed to remove plant flats from the channel with the flats being pushed onto the elevator conveyor by the hand held pusher 130 as shown in FIG. 2. Operators of the system place flats on, or remove flats from, the portable elevator conveyor in accordance with the function being performed.

Alternatively, pusher 130 could simply be a floating pipe or the like having cords connected adjacent its outer ends with the cords being operated from the work area and pulled toward the work area to urge the floating flats onto the submerged end of the elevator means 110 or to keep the outer row of flats in proper position. An important feature of the success of the operation is the fact that the plant flats are dimensioned so that they can be aligned in transverse rows consisting of three plant flats having their longest dimension substantially transverse to the length axis of the branch channels 78 as shown in FIG. 2. Also, the flats are arranged in three rows extending along the length of the branch channels as shown in FIG. 2.

Thus, the inventive system totally avoid the need for overhead spraying or the like which can result in the spread of disease and the loss of substantial quantities of liquid through evaporation. Moreover, the inventive system greatly reduces labor costs involved in the handling of the plant flats as compared to prior known systems. While numerous modifications of the disclosed embodiment will undoubtedly occur to those of skill in the art, it should be understood that the spirit and scope of the invention is to be limited solely by the appended claims.

I claim:

1. A method of handling plant flats comprising the steps of:
    (a) providing a plurality of floatable plant flats arranged in an array of longitudinal and lateral rows, each of the plant flats including a plurality of open-bottomed plant receiving cells containing growing media and seedling plants therein;
    (b) providing channel means for receiving the floatable plant flats in an array of longitudinal and lateral rows;
    (c) providing reversible conveyor means adjacent the channel means and selectively operable in first and second directions for selectively moving the floatable plant flats into or out of the channel means, respectively;
    (d) filling the channel means with a liquid;
    (e) positioning the array of floatable plant flats on a work area adjacent the liquid-containing channel means;
    (f) activating the conveyor means to operate in its first direction to serially deposit successive lateral rows of the floatable plant flats into the liquid-containing channel means, each lateral row pushing previously deposited lateral rows outwardly away from the work area;
    (g) exerting light force against the first-deposited lateral row of the floatable plant flats in a direction inwardly towards the work area to maintain the lateral alignment of the lateral rows of the floatable plant flats, while performing step (f); and
    (h) subsequently activating the conveyor means to operate in its second direction while simultaneously maintaining the light force of step (g) to effect serial removal of successive lateral rows of the floatable plant flats from the liquid-containing channels means in reverse order from which they were deposited.

2. The method of claim 1, further comprising performing the following steps between steps (f) and (h) while the floatable plant flats are in the channel means:
    (i) flowing the level of liquid in the channel means to lower the plant flats floating thereon onto mechanical supports and supporting the plant flats in midair with the open bottoms of the plant receiving cells being exposed to the air for drainage and air pruning of any roots therein; and
    (j) subsequently reintroducing nutrient containing liquid in the channel means to again float the plant flats for a predetermined time period.

3. The method of claim 2, wherein steps (i) and (j) are repeated a plurality of times until such time as plants growing the plant flats reach a desired size.

4. The method of claim 1, wherein a floating pusher is provided, and wherein in steps (g) and (h), the floating pusher is maintained in light pressure contact with the first-deposited lateral row of the floatable plant flats to effect the light force thereagainst.

5. A method of handling plant flats comprising the steps of:
    (a) providing a plurality of floatable plant flats, each of the plant flats including a plurality of open-bottomed plant receiving cells containing growing media and seedling plants therein;
    (b) providing channel means for receiving the floatable plant flats in a longitudinal row;
    (c) providing reversible conveyor means adjacent the channel means and selectively operable in first and second directions for selectively moving the floatable plant flats into or out of the channel means, respectively;
(d) filling the channel means with a liquid;
(e) positioning the floatable plant flats on a work area adjacent the liquid-containing channel means;
(f) activating the conveyor means to operate in its first direction to serially deposit successive floatable plant flats into the liquid-containing channel means, each successive plant flat pushing previously deposited plant flats outwardly away from the work area; and
(g) subsequently activating the conveyor means to operate in its second direction to effect serial removal of successive floatable plant flats from the liquid-containing channel means in reverse order from which they were deposited.

6. The method of claim 5, further comprising performing the following steps between steps (f) and (g) while the floatable plant flats are in the channel means:
(h) lowering the level of liquid in the channel means to lower the plant flats floating thereon onto mechanical supports and supporting the plant flats in midair with the open bottoms of the plant receiving cells being exposed to the air for drainage and air pruning of any roots therein; and
(i) subsequently reintroducing nutrient containing liquid in the channel means to again float the plant flats for a predetermined time period.

7. The method of claim 6, wherein step (h) and (i) are repeated a plurality of times until such time as plants growing the plant flats reach a desired size.

8. The method of claim 5, further comprising the steps of:
(h) exerting light force against the first-deposited floatable plant flat in a direction inwardly towards the work area, while performing step (f); and
(i) maintaining the light force of step (h) simultaneous with step (g).

9. The method of claim 8, wherein a floating pusher is provided, and wherein in steps (h) and (i), the floating pusher is maintained in light pressure contact with the first-deposited floatable plant flat to effect the light force thereagainst.

* * * * *